US 7,014,892 B2

(12) United States Patent
Nam et al.

(10) Patent No.: US 7,014,892 B2
(45) Date of Patent: *Mar. 21, 2006

(54) ALIGNMENT LAYER FOR A LIQUID CRYSTAL DISPLAY DEVICE

(75) Inventors: Mi Sook Nam, Kunpo (KR); Young Seok Choi, Daejon-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/846,522

(22) Filed: May 17, 2004

(65) Prior Publication Data

US 2004/0213924 A1    Oct. 28, 2004

Related U.S. Application Data

(62) Division of application No. 09/534,723, filed on Mar. 24, 2000, now Pat. No. 6,764,724.

(30) Foreign Application Priority Data

Mar. 25, 1999    (KR)    ................. 1999-10214

(51) Int. Cl.
  *C09K 19/56* (2006.01)
  *G02F 1/1337* (2006.01)
(52) U.S. Cl. .................... 428/1.2; 252/299.4; 349/123; 349/124; 349/135
(58) Field of Classification Search ................. 428/1.2, 428/1.25; 252/299.4; 349/123–124, 135
See application file for complete search history.

(56) References Cited

U.S. PATENT DOCUMENTS 3,912,920 A    10/1975 Kubota .................. 240/9.5

(Continued)

FOREIGN PATENT DOCUMENTS

DE    44 20 585    12/1995

(Continued)

OTHER PUBLICATIONS

W. Gibbons, et al., *Surface-mediated alignment of nematic liquid crystals with polarized laser light*, Letters to Nature, vol. 351, May 2, 1991, pp. 49 & 50.

(Continued)

*Primary Examiner*—Harold Pyon
*Assistant Examiner*—Sow-Fun Hon
(74) *Attorney, Agent, or Firm*—McKenna Long & Aldridge LLP

(57) ABSTRACT

The liquid crystal display device of the present invention comprises first and second substrates; a first alignment layer on the first substrate, wherein the first alignment layer includes

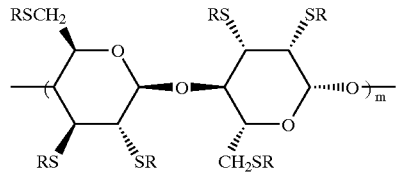

(spacer S is oxygen, m=10~10,000), the functional group R includes photo-sensitive constituents and/or non-photo-sensitive constituents, the photo-sensitive constituent includes a material selected from the group consisting of cinnamoyl derivatives, the non-photo-sensitive constituent includes a material selected from the group consisting of $C_nH_{2n}$, $C_nH_{2n+1}$, $C_nH_{2n}OH$, $COC_nH_{2n+1}$, $COC_nH_{2n}$, $C_nH_{2n+1-x}F_x$, $C_nH_{2n-(x-1)}F_{(x-1)}$, $C_nH_{2n-x}F_xOH$, $COC_nH_{2n+1-x}F_x$ (n=1~10, x=1~2n+1), and a combination thereof; and a liquid crystal layer between the first and second substrates.

20 Claims, 1 Drawing Sheet

U.S. PATENT DOCUMENTS

| | | | |
|---|---|---|---|
| 4,963,448 A | 10/1990 | Ichimura et al. | 430/20 |
| 4,974,941 A | 12/1990 | Gibbons et al. | 350/349 |
| 5,032,009 A | 7/1991 | Gibbons et al. | 350/341 |
| 5,073,294 A | 12/1991 | Shannon et al. | 252/299.01 |
| 5,296,321 A | 3/1994 | Kawanishi et al. | 430/20 |
| 5,389,698 A | 2/1995 | Chigrinov et al. | 522/2 |
| 5,405,552 A * | 4/1995 | Jungbauer et al. | 252/299.4 |
| 5,447,662 A | 9/1995 | Herr et al. | 252/582 |
| 5,453,862 A | 9/1995 | Toko et al. | 359/76 |
| 5,464,669 A | 11/1995 | Kang et al. | 428/1 |
| 5,479,282 A | 12/1995 | Toko et al. | 359/75 |
| 5,538,823 A | 7/1996 | Park et al. | 430/20 |
| 5,539,074 A | 7/1996 | Herr et al. | 526/326 |
| 5,576,862 A | 11/1996 | Sugiyama et al. | 359/75 |
| 5,578,351 A | 11/1996 | Shashidhar et al. | 428/1 |
| 5,602,661 A | 2/1997 | Schadt et al. | 349/124 |
| 5,604,615 A | 2/1997 | Iwagoe et al. | 349/124 |
| 5,705,096 A | 1/1998 | Kano et al. | 252/299.4 |
| 5,786,041 A | 7/1998 | Takenaka et al. | 428/1 |
| 5,824,377 A | 10/1998 | Pirwitz et al. | 428/1 |
| 5,853,818 A | 12/1998 | Kwon et al. | 427/510 |
| 5,856,430 A | 1/1999 | Gibbons et al. | 528/353 |
| 5,856,431 A | 1/1999 | Gibbons et al. | 528/353 |
| 5,859,682 A | 1/1999 | Kim et al. | 349/124 |
| 5,880,803 A | 3/1999 | Tamai et al. | 349/156 |
| 5,882,238 A | 3/1999 | Kim et al. | 445/24 |
| 5,889,571 A | 3/1999 | Kim et al. | 349/124 |
| 5,909,265 A | 6/1999 | Kim et al. | 349/124 |
| 5,928,561 A | 7/1999 | Bryan-Brown et al. | 252/299.4 |
| 5,982,466 A | 11/1999 | Choi et al. | 349/124 |
| 6,001,277 A * | 12/1999 | Ichimura et al. | 252/299.4 |
| 6,399,165 B1 * | 6/2002 | Kwon et al. | 428/1.2 |
| 6,572,939 B1 * | 6/2003 | Kwon et al. | 428/1.2 |
| 6,764,724 B1 * | 7/2004 | Nam et al. | 428/1.2 |

FOREIGN PATENT DOCUMENTS

| | | |
|---|---|---|
| DE | 197 03 682 A1 | 8/1997 |
| DE | 198 53 247 A1 | 6/1999 |
| EP | 0 261 712 A1 | 3/1988 |
| EP | 0 525 473 | 2/1993 |
| EP | 0 525 478 | 2/1993 |
| EP | 0 549 283 A2 | 6/1993 |
| EP | 0 635 748 A1 | 1/1995 |
| EP | 0 690 334 | 1/1996 |
| EP | 0 708 354 | 4/1996 |
| EP | 0 611 786 | 7/1996 |
| EP | 0 742 471 | 11/1996 |
| EP | 0 750 212 | 12/1996 |
| EP | 0 788 012 A2 | 8/1997 |
| FR | 2 771 518 A1 | 5/1999 |
| GB | 2 281 977 | 3/1995 |
| GB | 2 286 893 | 8/1995 |
| GB | 2 309 793 | 8/1997 |
| GB | 2 309 794 | 8/1997 |
| GB | 2 310 048 | 8/1997 |
| GB | 2 317 964 | 4/1998 |
| GB | 2 319 093 | 5/1998 |
| GB | 2 331 591 B1 | 3/2000 |
| JP | 64-60833 | 3/1989 |
| JP | 1-251344 | 10/1989 |
| JP | 1-251345 | 10/1989 |
| JP | 2-55330 | 2/1990 |
| JP | 2-298917 | 12/1990 |
| JP | 3-36527 | 2/1991 |
| JP | 03-100520 | 4/1991 |
| JP | 3-120503 | 5/1991 |
| JP | 3-241311 | 10/1991 |
| JP | 04-7520 | 1/1992 |
| JP | 4-284421 | 10/1992 |
| JP | 4-350822 | 12/1992 |
| JP | 5-019208 | 1/1993 |
| JP | 5-34699 | 2/1993 |
| JP | 5-53513 | 3/1993 |
| JP | 5-232473 | 9/1993 |
| JP | 7-56173 | 3/1995 |
| JP | 7-261185 | 10/1995 |
| JP | 7-318861 | 12/1995 |
| JP | 7-318942 | 12/1995 |
| JP | 8-334790 | 12/1996 |
| JP | 9-211465 | 8/1997 |
| JP | 9-211468 | 8/1997 |
| JP | 9-265095 | 10/1997 |
| JP | 9-318946 | 12/1997 |
| JP | 10-090684 | 4/1998 |
| JP | 10-154658 | 6/1998 |
| JP | 10-161126 | 6/1998 |
| JP | 10-332932 | 12/1998 |
| JP | 11-194344 | 7/1999 |
| JP | 11-194345 | 7/1999 |
| WO | 94/28458 | 12/1994 |
| WO | 95/18989 | 7/1995 |
| WO | 95/22075 | 8/1995 |
| WO | 95/34843 | 12/1995 |
| WO | 96/22561 | 7/1996 |
| WO | 99/08148 | 2/1999 |

OTHER PUBLICATIONS

Martin Schadt, *Surface-Induced Parallel Alignment of Liquid Crystals by Linearly Polymerized Photopolymers*, Jpn. J. Appl. Phys. vol. 31 (1992), Part 1, No. 7, Jul. 1992.

Yasufumi Iimura, et al., *Alignment Control of a Liquid Crystal on a Photosensitive Polyvinylalcohol Film*, Jpn. J. Appln. Phys. vol. 32 (1993), Part 2, No. 1A/B, Jan. 15, 1993.

Kunihlro Ichimura, *Photocontrol of Liquid Crystal Alignment*, 1993.

T. Marushii, et al., *Photosensitive Orientants for Liquid Crystal Alignment*, Mol. Mat. 1993, Vol. 3, pp. 161-168.

Y. Toko, et al., *TN-LCDs Fabricated by Non-Rubbing Showing Wide and Homogeneous Viewing Angular Characteristics and Excellent Voltage Holding Ratio*, SID 93 Digest, pp. 622-625.

P. Shannon, et al., *Patterned optical properties in photopolymerized surface-aligned-liquid-crystal films*, Letters to Nature, vol. 368, Apr. 7, 1994, pp. 532 & 533.

Y. Iimura, et al., *Inveited Address: Electro-Optic Characteristics of Amorphous and Super-Multidomain TN-LCDs Prepared by a Non-Rubbing Method*, SID 94 Digest, pp. 915-918.

M. Schadt, et al., *Photo-Generation of Linearly Polymerized Liquid Crystal Aligning Layers Comprising Novel, Integrated Optically Patterned Retarders and Color Filters*, Jpn. J. Appl. Phys. vol. 34 (1995), pp. 3240-3249, Part 1, No. 6A, Jun 1995.

A. Lien, et al., *UV modification of surface pretilt of alignment layers of multidomain liquid crystal displays*, Appl. Phys. Lett. 62 (21), Nov. 20, 1995, pp. 3108-3111.

M. Hasegawa, *Nematic Homogeneous Photo Alignment by Polyimide Exposure to Linearly Polarized UV*, Journal of Photopolymer Science and Technology, vol. 8, No. 2, 1995, pp. 241-248.

M. Schadt, *Investigation of the Mechanism of the Surface-Induced Alignment of Liquid Crystals by Linearly Polymerized Photopolymers*, SID 95 Digest, pp. 528-531.

J. West, et al., *Polarized UV-Exposed Polyimide Films for Liquid-Crystal Alignment*, SID 95 Digest, pp. 703-705.

T. Hashimoto, et al., *TN-LCD with Quartered Subpixels Using Polarized UV-Light-Irrediated Polymer Orientation Films*, SID 95 Digest, pp. 877-880.

T. Saitoh, et al., *A New Hybrid N-TB Mode LCD with Two Domain Pixels Fabricated Using a Photopolymer*, Asia Display '95, pp. 589-592.

A. Lien, *UV-Type Two-Domain Wide Viewing Angle TFT/LCD Panels*, Asia Display '95, pp. 593-596.

T. Yamamoto, *Liquid-Crystal Alignment by Slantwise Irradiation of Non-Polarized UV Light on a Polyimide Layer*, SID 96 Digest, pp. 642-645.

M. Schadt, et al., *Optical patterning of multi-domain liquid-crystal displays with wide viewing angles*, Letters to Nature, vol. 381, May 16, 1996.

J. Chen, *Model of liquid crystal alignment by exposure to linearly polarized ultraviolet light*, Physical Review E. Vol. 54, No. 2, Aug. 1996, pp. 1599-1603.

H. Soh, et al., *The Realization of Wide Viewing Angle TFT-LCDs using Photo-Alignment Method*, Euro Display '96, pp. 579-582.

J. Chen, *Mechanisim of Liquid-Crystal Alignment by Polyimide Exposure to Linearly Polarized UV Light*, SID 96 Digest, pp. 634-637.

K. Lee, et al., *Late-News Poster: Mechanism of UV Modification of LC Pretilt Angle and Its Application to Two-Domain TN-LCDs*, SID 96 Digest, pp. 638-641.

J. Kim, et al., *Late-News Poster: Photo-Alignment of Liquid Crystals Using a New Photopolymer*, SID 96 Digest, pp. 646-649.

Y. Saitoh, et al., *Stability of UV-Type Two-Domain Wide-Viewing-Angle TFT-LCD Panels*, SID 96 Digest, pp. 662-665.

D. Seo, et al., *Invited Address: Surface Alignment of Liquid Crystals in LCDs*, SID 93 Digest, pp. 954-956.

Y. Iimura, *Inviled Paper:Prospects of the Photo-Alignment Technique for LCD fabrication*, SID 97 Digest, pp. 311-314.

R. Shashidhar, et al., *A New Non-Rubbing Technique for Liquid-Crystal Alignment*, SID 97 Digest, pp. 315-318.

M. Schadt, et al., *Invited Paper: Optical Patterning of Multidomain LCDs*, SID 97 Digest, pp. 397-400.

K. Han, et al., *A Study on the Photo-Alignment of the Polymer-Containing Cinnamate Group Using a New Single UV-Exposure Method*, SID 97 Digest, pp. 707-710.

F. Yamada, et al., *Late-News Poster: A New Photo-Alignment Scheme for LC-Cell Pretilt Control*, SID 97 Digest, pp. 715-718.

M. Nam, et al., *Wide-Viewing-Angle TFT-LCD with Photo-Aligned Four-Domain TN Mode*, SID 97 Digest, pp. 933-936.

N. Mori, M. Morimoto, and K. Nakamura, Hydroxypropylcellulose Films as Alignment Layers for Liquid Crystals, Macromolecules, Mar. 9,1999, vol. 32, No. 5 pp. 1488-1492, American Chemical Society, Easton, U.S.

Lim et al.; *"Tilting of Liquid Crystal through Interaction with Methyl Orange Molecules Oriented by Circularly Polarized Light"* ; JP Journal of Applied Physics; vol. 35; Oct./1996. pp. 1281-1283.

Eugene Hecht; *"OPTICS"*; 1987; pp. 298-299.

Jenkins et al., *"Fundamentals of Optics"*; McGraw-Hill Book Company; Third Edition; 1957; pp 492-493.

UK Search Report and Examination, pp. 1-4, Jul., 2000.

\* cited by examiner

ALIGNMENT LAYER FOR A LIQUID CRYSTAL DISPLAY DEVICE

CROSS-REFERENCE TO RELATED APPLICATIONS

This application is a divisional application of U.S. patent application Ser. No.: 09/534,723 filed Mar. 24, 2000, now U.S. Pat. No. 6,764,724; which claims priority to Korean Patent Application No. 1999-10214, filed Mar. 25, 1999, each of which is incorporated by reference for all purposes as if fully set forth herein.

BACKGROUND OF THE INVENTION

1. Field of the Invention

The present invention relates to an alignment layer, and more particularly to an alignment layer with photo-sensitivity.

2. Description of the Related Art

It is generally known that a liquid crystal consists of anisotropic molecules. The average direction of the long axes of the id crystal molecules is called the director of the liquid crystal. The director distribution in a liquid crystal is determined by the anchoring energy on a substrate, and is characterized by a director corresponding to a minimum of the surface energy of the liquid crystal and the anchoring energy. The director is rearranged by an electric field generated during operation of a liquid crystal display device (LCD). An LCD comprises two opposed substrates having liquid crystal therebetween.

In general, to obtain uniform brightness and a high contrast ratio, it is necessary to align the liquid crystal molecules uniformly in a liquid crystal cell. Several techniques have been proposed using polymers to obtain single or mono-domain homogeneous alignment of liquid crystals. Particularly, it is known that polyimide or polysiloxane-based materials have high quality and good thermostability.

The most common technique employed as an alignment method to obtain a mono-domain liquid crystal cell involves forming microgrooves on the surface of the alignment polymer, which provides strong anchoring and stable alignment. In the above-mentioned technique, known as the rubbing method, a substrate coated with an alignment polymer is rubbed with a cloth. The rubbing method is a good method which can be applied to large scale LCDs, and thus is widely used in the industry.

The rubbing method, however, has several serious drawbacks. Because the shape of the microgrooves formed on the alignment layer depends on the rubbing cloth and rubbing intensity, the resulting alignment of the liquid crystal is often heterogeneous, causing phase distortion and light scattering. Further, electrostatic discharge (ESD) generated by rubbing of the polymer surface further generates dust contamination in an active matrix LCD panel, decreasing production yield and damaging the substrate.

In order to solve these problems, a photo-alignment method has been proposed using polarized ultraviolet light irradiated onto a photosensitive polymer to photo-polymerize the polymer (A. Dyadyusha, V. Kozenkov et al., *Ukr. Fiz. Zhurn.*, 36 (1991) 1059; W. M. Gibbons et al., *Nature*, 351 (1991) 49; M. Schadt et al., *Jpn. J. Appl. Phys.*, 31 (1992) 2155; T. Ya. Marusii & Yu. A. Reznikov, *Mol. Mat.*, 3 (1993) 161; EP 0525478; and U.S. Pat. No. 5,538,823—a polyvinyl-fluoro cinnamate patent). The alignment capability of the photosensitive polymer is determined by the anisotropy of the photosensitive polymer, which is induced by ultraviolet light irradiation.

In the photo-alignment method, an alignment layer is given an alignment direction by irradiating a substrate coated with a photo-alignment material with linearly polarized UV light. The photo-alignment layer comprises a polyvinyl cinnamate-based (PVCN) polymer, and as linearly polarized UV light is irradiated, the polymer photo-polymerizes through cross-linking. Cross-linking is generated among the polymers by the UV light energy.

The alignment direction of the photo-alignment layer has a specific direction in relation to the polymerization direction of the linearly polarized UV light. The alignment direction of the photo-alignment layer is determined by the direction of the photo-polymers. The pretilt angle of the photo-alignment layer is determined by the incident direction and the irradiating energy of the irradiated UV light. That is to say, the pretilt angle direction and the pretilt angle of the photo-alignment layer are determined by the polarized direction and the irradiating energy of the irradiated UV light.

With regard to photo-alignment, a polarizer is rotated at an arbitrary angle on each domain of the LCD. Then, in response to irradiating UV light, the polarization direction is changed, whereby a multi-domain LCD cell is achieved with multiple domains having different alignment directions in relation to each other.

The photo-alignment method, however, has several drawbacks. For example, it is impossible to apply on a wide scope. Most importantly, low photo-sensitivity of the photo-alignment material results in reduction of anisotropy and thermostability.

UV light irradiation takes a long time using conventional techniques, from approximately 5 to as long as 10 minutes. Low photo-sensitivity and small anisotropy make the anchoring energy of the final photo-alignment layer weak. Moreover, when the liquid crystal is injected into the liquid crystal panel, it is required that the injection be made at a high temperature. Low thermostability induces a flowing effect on the substrates, which can be observed as a ripple pattern in the liquid crystal upon injection between the substrates. Finally, disclination owing to the non-uniform alignment of liquid crystals remains as a problem to be solved.

SUMMARY OF THE PREFERRED EMBODIMENTS

Accordingly, the present invention is directed to a LCD that substantially obviates one or more of the problems due to limitations and disadvantages of the related art.

An object of the present invention is to provide an LCD having good thermostability and photo-sensitivity.

Another object of the present invention is to provide an alignment layer having good stability and pretilt angles which are easily controlled, which results from inserting a spacer such as a polyoxomethyl group between the main chain and the functional group including cinnamoly derivatives in a CelCN photo-aligning material.

Hydroxyethyl cellulosecinnamate (HE-CelCN) of the present invention has a strong anchoring energy, good photo-sensitivity, adhesive strength, and high thermostability so that it could provide an excellent and stable alignment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof.

To achieve these and other advantages and in accordance with the purpose of the present invention, as embodied and broadly described herein, the liquid crystal display device of the present invention comprises first and second substrates; a first alignment layer on the first substrate, wherein the first alignment layer includes

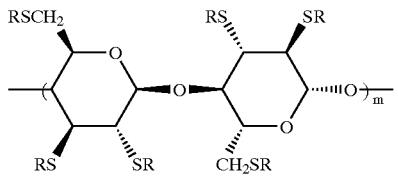

(spacer S is oxygen, m=10~10,000), the functional group R includes at least one of a group consisting of photo-sensitive constituents and non-photo-sensitive constituents, the photo-sensitive constituents include a material selected from the group consisting of cinnamoyl derivatives, the non-photo-sensitive constituents include a material selected from the group consisting of $C_nH_{2n}$, $C_nH_{2n+1}$, $C_nH_{2n}OH$, $COC_nH_{2n+1}$, $COC_nH_{2n}$, $C_nH_{2n+1-x}F_x$, $C_nH_{2n-(x-1)}F_{(x-1)}$, $C_nH_{2n-x}F_xOH$, $COC_nH_{2n+1-x}F_x$ (n=1~10, x=1~2n+1), and a combination thereof; and a liquid crystal layer between the first and second substrates.

The liquid crystal display device of the present invention preferably comprises a second alignment layer on the second substrate. The second alignment layer includes a material selected from the group consisting of a pyranose polymer, a furanose polymer, polyvinyl cinnamate, polysiloxane cinnamate, polyvinyl alcohol, polyamide, polyimide, polyamic acid and silicone dioxide.

The cinnamoyl derivative includes at least one member selected from the group consisting of hydrogen, fluorine, chlorine, cyano, $NO_2$, $CH_3$, $OCH_3$, $CF_3$, $OCF_3$, $C_nH_{2n+1}$, $OC_nH_{2n+1}$, $C_6H_5$, $C_6H_4OC_nH_{2n+1}$, $C_nH_{2n+1-x}F_x$, $OC_nH_{2n+1-x}F_x$ (n=1~10, x=1~2n+1).

Alternatively, the cinnamoyl derivative is

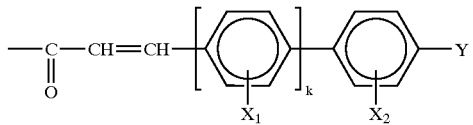

($X_1$ $X_2$ are each selected from the group consisting of hydrogen, fluorine, chlorine, CN, $NO_2$, $CH_3$, $OCH_3$, $CF_3$, $OCF_3$; k is 0 to 1; Y is selected from the group consisting of hydrogen, fluorine, chlorine, cyano, $NO_2$, $CF_3$, $OCF_3$, $C_nH_{2n+1}$, $OC_nH_{2n+1}$, $C_nH_{2n+1-x}F_x$, $OC_nH_{2n+1-x}F_x$ (n=1~10, x=1~2n+1)).

It is to be understood that both the foregoing general description and the following detailed description are exemplary and explanatory and are intended to provide further explanation of the invention as claimed.

BRIEF DESCRIPTION OF THE DRAWINGS

For a more complete understanding of the present invention and the advantages thereof, reference is now made to the following descriptions taken in conjunction with the accompanying drawing, in which.

DETAILED DESCRIPTION OF THE PREFERRED EMBODIMENTS

Figure 1:
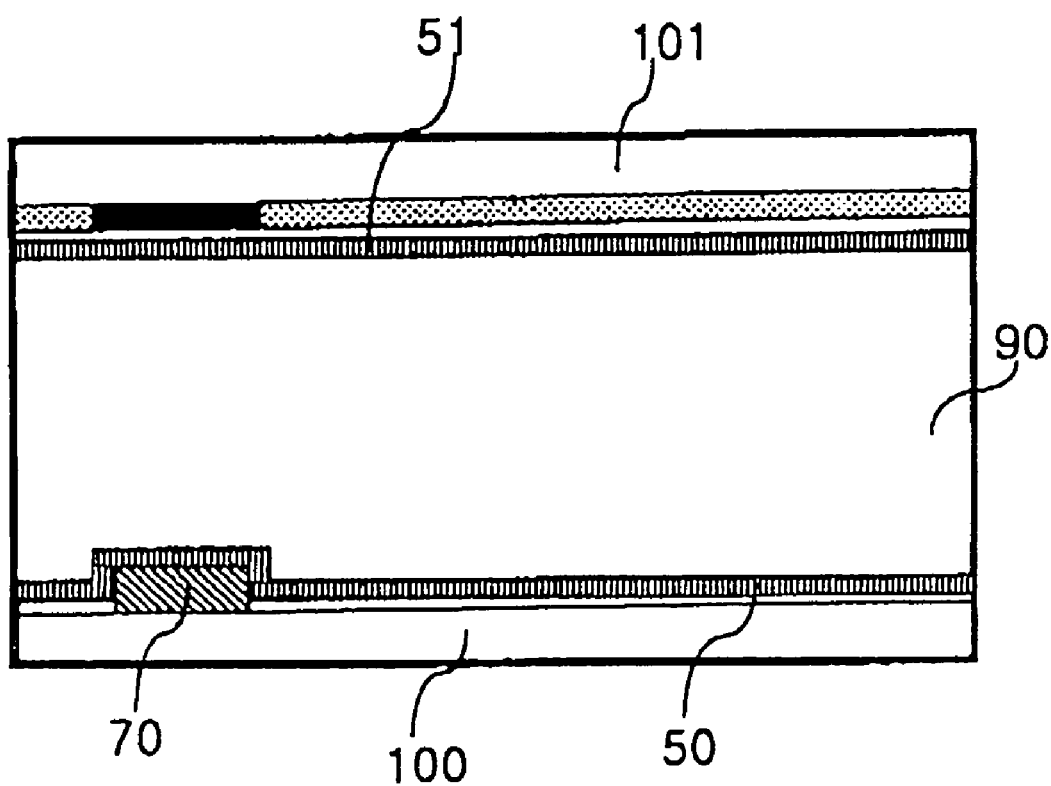
FIG. 1 illustrates a liquid crystal display (LCD) device according to one or more aspects of the present invention.

Reference will now be made in detail to the preferred embodiments of the present invention.

In order to enhance the sensitivity of a photo-alignment layer for a liquid crystal device and obtain thermostable anchoring of the liquid crystal, cellulose cinnamate (CelCN) consisting of a main chain and hydroxyethyl group between functional groups is used as the photo-alignment material. Several different forms of hydroxyethyl cellulose cinnamate (HE-CelCN) suitable for hydroxyethyl cellulose and cinnamoyl chloride having various substitution ratios.

A cinnamic acid is first prepared by reacting a benzaldehyde with malonic acid in pyridine and piperidine. The cinnamic acid is then reacted with thionyl chloride to produce a cinnamoyl chloride derivative. The HE-CelCN is finally synthesized by reacting HE-cellulose with the cinnamoyl chloride derivative in an inert solvent (such as chloroform, nitrobenzene, chlorobenzene, or the like). The reaction mixture is diluted with methanol, filtered, dried in a vacuum, and milled by a vibrating mill, whereupon the CelCN is obtained.

A process of forming an alignment layer according to an embodiment of the present invention comprises the following three steps.

First, a polymer solution is prepared using dichloroethane as a solvent. The concentration of the polymer determines the ultimate thickness of the alignment layer on the LCD substrates. To form a film having a thickness of approximately 1 $\mu$m, HE-CelCN solution of 10 g/l is selected for coating the substrate.

Second, a drop of the HE-CelCN solution is placed in the center of the substrate using a measuring pipette, followed by spin-coating while centrifuging at a rotation speed of 3000 rpm for 30 seconds. The produced film is immediately prebaked at 100° C. for 1 hour.

Third, the initially isotropic polymer film is irradiated with polarized UV light having a wavelength $\lambda$ below 365 nm to render it anisotropic, with either a positive or a negative dielectric. The irradiation time is more than 5 seconds, and the intensity of UV light is about 5 mW/cm².

An embodiment of the light irradiating procedure utilizes a substrate, a photo-alignment layer including a HE-CelCN on the substrate, a lamp for irradiating UV light over the photo-alignment layer, and a polarizer for polarizing the light irradiated from the lamp.

The lamp (for example) is a Halogen (Hg) lamp. Light having an average power of 500 W is transmitted from a lens of the halogen lamp, polarized by polarizer, and irradiated onto the photo-alignment layer at a power of 5 mW/cm².

First irradiation is performed by vertically irradiating UV light on the substrate for 2~10 minutes, and the polarization of UV light is perpendicular to the longitudinal direction of the substrate. Second irradiation is performed by inclinedly irradiating UV light on the substrate in 45° C. for 5~40 seconds, and the polarization of the UV light is parallel with the incident light (P wave).

An LCD employing the alignment layer of the present invention comprises a substrate having an alignment layer of HE-CelCN, and the other substrate having an alignment layer of polyimide(PI). The PI alignment layer is rubbed, so that the alignment direction thereof is determined and is parallel with the longitudinal of the substrate. The above substrates are laminated using spacers of 6.4 μm therebetween, and liquid crystal material of ZLI 4801-000 is injected therebetween. The cell gap is 4 to 5 μm.

Reviewing the characteristics of the LCD, it could obtain a uniform alignment with a good quality even with the short irradiating time. The alignment layer has a stronger anchoring energy compared with the alignment obtained from conventional photo-alignment materials.

The pretilt angle of alignment layer of HE-CelCN according to the irradiation time has been measured and the values thereof are as follows in Table 1, which shows the pretilt angle of the alignment layer is determined by the irradiation time.

TABLE 1

| Materials | First Irradiation (min) | Second Irradiation (sec) | Pretilt Angle (°) |
| --- | --- | --- | --- |
| Hydroxyethyl Cellulose 4-fluorocinnamate | 2 | 10 | 4 |
| | 2 | 20 | 6 |
| | 2 | 40 | 8 |
| Hydroxyethyl Cellulose 5-methoxycinnamate | 10 | 5 | 3 |
| | 10 | 10 | 5 |

To estimate the thermostability of the CelCN, the quality of the alignment layer was checked using an electro-optical technique. Electro-optical response, in terms of cell transmittance ratio between crossed and parallel polarizers, anchoring energy and surface density of the alignment layer were each measured in a twisted nematic (TN) cell containing samples of the CelCN layers. The cell was heated to about 100° C. and kept at this temperature for 4 hours. After cooling the samples to room temperature, it was observed that the performance characteristics were maintained without change.

Among its other advantages, UV irradiation time is significantly reduced. Whereas prior art photo-alignment techniques involved UV irradiation for anywhere from 5 to 10 minutes, this provides a method which successfully achieves photo-alignment using UV irradiation in anywhere from about 0.5 seconds to one minute. The results are shown in the following TABLE 2:

TABLE 2

| Materials | Irradiation Time (sec) | Tilt (°) | Thermostability (°) |
| --- | --- | --- | --- |
| Polysiloxane 4-fluorocinnamate | 200 | 0 | 0 |
| | 1000 | 0 | 0 |
| Polyvinyl 4-fluorocinnamate | 200 | 0 | Alignment broken |
| | 500 | 0 | |
| Hydroxyethyl 4-fluorocinnamate | 30 | 1 | 1 |
| | 60 | 2 | 2 |

Preferred embodiments of the present invention will now be described in further detail. It should be understood that these examples are intended to be illustrative only and that the present invention is not limited to the conditions, materials or devices recited therein.

EXAMPLE 1

Synthesis of 4-fluorocinnamic acid

A mixture of 0.1 mol 4-fluorobenzaldehyde, 0.15 mol malonic acid, and 0.1 ml piperidine in 30 ml pyridine is boiled for 10 hours, cooled, and treated with 150 ml HCl having a 10% concentration. The precipitate is filtered and crystallized with ethanol. The yield of 4-fluorocinnamic acid is 68% and the melting point is 211° C.

The following compounds are synthesized in a similar manner:
  2-fluoro cinnamic acid;
  3-fluoro cinnamic acid;
  3-chloro cinnamic acid;
  4-chloro cinnamic acid;
  2-methyl cinnamic acid;
  4-phenyl cinnamic acid;
  4-methoxy cinnamic acid;
  4-pentoxy cinnamic acid;
  4-heptyloxy cinnamic acid;
  4-nonyloxy cinnamic acid;
  4-(4-pentoxyphenyl)cinnamic acid;
  4-trifluoromethoxy cinnamic acid;
  4-trifluoromethyl cinnamic acid;
  4-pentyl cinnamic acid; and
  4-methoxy-3-fluorocinnamic acid.

EXAMPLE 2

Synthesis of HE-cellulose Cinnamate

A mixture of 0.05 mol cinnamoyl chloride (prepared from a cinnamic acid produced in Example 1, an excess of thionyl chloride, and catalytic quantities of dimethyl formamide), 0.01 mol HE-cellulose, and 0.06 mol pyridine in 20 ml nitrobenzene is heated for 24 hours at 80° C., cooled, and diluted with methanol. The reaction product is filtered, washed with methanol and water, dried in a vacuum, and subsequently milled by a vibrating mill. The yield of cellulose cinnamate is approximately 65% to 92%. Thin layer chromatography (TLC) reveals there is no cinnamic acid in the reaction products.

The mechanism of the synthesis according to an embodiment of the present invention is as follows:

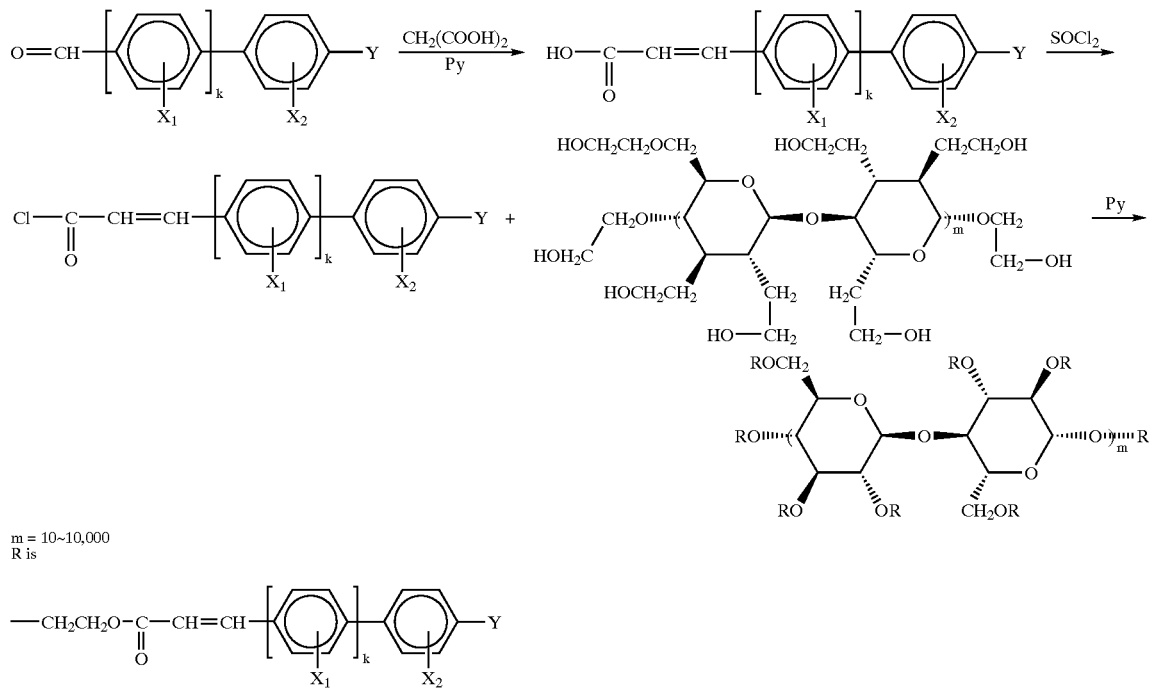

m = 10~10,000
R is

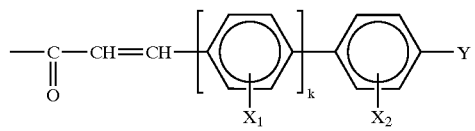

$X_1$ and $X_2$ are each selected from the group consisting of hydrogen, fluorine, chlorine, CN, $NO_2$, $CH_3$, $OCH_3$, $CF_3$, $OCF_3$ k=0~1

Y is hydrogen, fluorine, chlorine, CN, $NO_2$, $CF_3$, $OCF_3$, $C_nH_{2n+1}$, $OC_nH_{2n+1}$, $C_nH_{2n+1-x}F_x$, $OC_nH_{2n+1-x}F_x$ (n=1~10, x=1~2n+1)

In addition, R includes a material selected from the group consisting of OH, SH, $OC_nH_{2n+1}$, $COC_nH_{2n+1}$, $OC_nH_{2n}OH$, $OCOC_nH_{2n+1}$, $NHCOC_nH_{2n+1}$ (n=1~10), or cinnamoyl derivatives including hydrogen, fluorine, chlorine, CN, $NO_2$, $CH_3$, $OCH_3$, $CF_3$, $OCF_3$, $C_nH_{2n+1}$, $OC_nH_{2n+1}$, $C_6H_5$, $C_6H_4OC_nH_{2n+1}$, $C_nH_{2n+1-x}F_x$ or $OC_nH_{2n+1-x}F_x$ (n=1~10, x=1~2n+1).

Also, it is possible that the cinnamoyl derivative is ($X_1$ and $X_2$ are each selected from the group consisting of hydrogen, fluorine, chlorine, CN, $NO_2$, $CH_3$, $OCH_3$, $CF_3$, $OCF_3$; k is 0 to 1; Y is selected from the group consisting of hydrogen, fluorine, chlorine, cyano, $NO_2$, $CF_3$, $OCF_3$, $C_nH_{2n+1}$, $OC_nH_{2n+1}$, $C_nH_{2n+1-x}F_x$, $OC_nH_{2n+1-x}F_x$ (n=1~10, x=1~2n+1), and has a functional group as a spacer such as O, S, NH, $OC_hH_{2h}$, $OC_hH_{2h}O$ (h=1~5) or the like between the main chain of the cellulose polymer and the cinnamoyl derivative.

As shown in FIG. 1, a liquid crystal display device comprises first and second substrates 100, 101, respectively, a thin film transistor (TFT) 70 on the first substrate 100, a first alignment layer 50 formed entirely over the TFT 70 and first substrate 100, a second alignment layer 51 formed on second substrate 101, and a liquid crystal layer 90 injected between the first and second substrates 100, 101.

First and/or second alignment layers 50, 51 include a pyranose or furanose polymer, for example the HE-CelCN showed above. The HE-CelCN provides good uniform alignment in a short irradiation time.

The pyranose and furanose polymers preferably comprise both photo-sensitive constituents and non-photo-sensitive constituents which are composited in a specific ratio. It includes a spacer such as O, S, NH, $OC_hH_{2h}$, $OC_hH_{2h}O$ (h=1~5) or the like between the main chain of the polymer and photo-sensitive or non-photo-sensitive constituent.

The pyranose and furanose polymers can be composited with only one constituent from each of photo-sensitive and non-photo-sensitive constituents, or one or more different photo-sensitive and/or non-photo-sensitive constituents.

When UV light is irradiated onto the first and/or second alignment layers at least once, the alignment direction and the pretilt angle are determined and alignment stability of the liquid crystal is achieved.

As the light used in the photo-alignment method, light in the UV range is preferable. It is not advantageous to use unpolarized light, linearly polarized light, or partially polarized light.

Moreover, it is contemplated that only one substrate of the first and second substrates be photo-aligned using the above-described method while the other substrate is not so treated. If both substrates are photo-aligned, it is possible that the other substrate be treated with polyamide or polyimide as the alignment material and that the alignment be accomplished by rubbing methods. It is also possible to use a photo-sensitive material such as polyvinyl cinnamate (PVCN) or polysiloxane cinnamate (PSCN) as the alignment material for the other substrate and accomplish the alignment using photo-alignment methods.

As to the nature of liquid crystal layer, it is possible to align the long axes of the liquid crystal molecules parallel with the first and second substrates to produce a homogeneous alignment. It is also possible to align the long axes of the liquid crystal molecules perpendicular to the first and second substrates to achieve a homeotropic alignment. Moreover, it is possible to align the long axes of the liquid crystal molecules with a specific predetermined angle in relation to the substrates, with a tilted alignment in relation to the substrates, with a twisted alignment in relation to the substrates, or in an alignment parallel to one substrate and perpendicular to the other substrate to provide a hybrid homogeneous-homeotropic alignment. It is thus essentially possible to apply any mode of alignment of the liquid crystal molecules in relation to the substrates as may be desired, such choices being apparent to one of ordinary skill in the art.

Also, the first and/or second alignment layers can be divided into two or more domains by creating different directional alignments of the liquid crystal molecules on each domain in relation to the direction of the substrates. Accordingly, a multi-domain LCD such as a 2-domain LCD, a 4-domain LCD, and so on can be obtained, wherein the liquid crystal molecules in each domain are driven differently.

An LCD made in this way is characterized by excellent thermostability. It is thus possible to inject the liquid crystal into the liquid crystal cell at room temperature while preventing and avoiding any flowing effect from being generated, as occurs in conventional techniques. Furthermore, the photo-alignment layer of the present invention possesses excellent photosensitivity, adhesion, and strong anchoring energy. As a result, it is possible to align the liquid crystal effectively and increase alignment stability of the liquid crystal.

It will be apparent to those skilled in the art that various modifications and variations can be made in the liquid crystal display device of the present invention without departing from the spirit or scope of the invention. Thus, it is intended that the present invention covers the modifications and variations of this invention provided they come within the scope of the appended claims and their equivalents.

The invention claimed is:

1. A liquid crystal display device, comprising: first and second substrates; a first alignment layer on the first substrate, wherein the first alignment layer includes

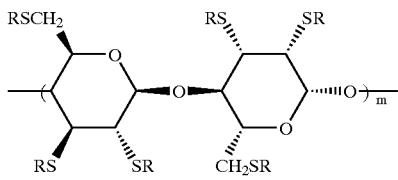

where the spacer S is sulfur, where m=10~10,000, and where the functional group R includes photosensitive constituents which include a cinnamoyl derivative and/or non-photosensitive constituents, wherein the cinnamoyl derivative is

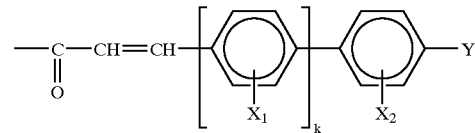

(X1 and X2 are each selected from the group consisting of hydrogen, fluorine, chlorine, CN, NO2, CH3, OCH3, CF3, OCF3; k is 0 to 1; Y is selected from the group consisting of hydrogen, fluorine, chlorine, cyano, $NO_2$, $CF_3$, $OCF_3$, $C_nH_{2n+1}$, $OC_nH_{2n+1}$, $C_nH_{2n+1-x}F_x$, $OC_nH_{2n+1-x}F_x$ (n=1~10, x=1~2n+1));
and a liquid crystal layer between the first and second substrates.

2. The liquid crystal display device according to claim 1, further comprising a second alignment layer on the second substrate.

3. The liquid crystal display device according to claim 2, wherein the second alignment layer includes a material selected from the group consisting of a pyranose polymer, a furanose polymer, polyvinyl cinnamate, polysiloxane cinnamate, polyvinyl alcohol, polyamide, polyimide, polyamic acid and silicone dioxide.

4. The liquid crystal display device according to claim 2, wherein at least one of the first and second alignment layers is divided into at least two domains for driving liquid crystal molecules in the liquid crystal layer differently on each domain.

5. The liquid crystal display device according to claim 1, wherein the non-photo-sensitive constituents include a material selected from the group consisting of H, $C_nH_{2n}$, $C_nH_{2n+1}$, $C_nH_{2n}OH$, $COC_nH_{2n+1}$, $C_nH_{2n+1-x}F_x$, $C_nH_{2n-(x-1)}F_{(x-1)}$, $C_nH_{2n-(x-1)}F_{(x-1)}OH$, $COC_nH_{2n+1-x}F_x$ (n=1~10, x=1~2n+1), and a combination thereof.

6. A liquid crystal display device, comprising: first and second substrates; a first alignment layer on the first substrate, wherein the first alignment layer includes

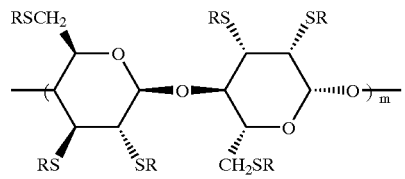

where the spacer S is NH, where m=10~10,000, and where the functional group R includes photosensitive constituents which include a cinnamoyl derivative and/or non-photosensitive constituents, wherein the cinnamoyl derivative is

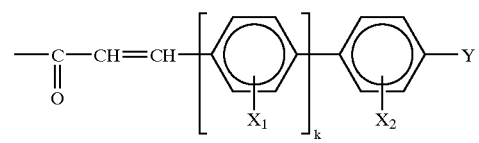

(X1 and X2 are each selected from the group consisting of hydrogen, fluorine, chlorine, CN, NO2, CH3, OCH3, CF3, OCF3; k is 0 to 1; Y is selected from the group consisting of hydrogen, fluorine, chlorine, cyano, $NO_2$, $CF_3$, $OCF_3$, $C_nH_{2n+1}$, $OC_nH_{2n+1}$, $C_nH_{2n+1-x}F_x$, $OC_nH_2H_{2n+1-x}F_x$ (n=1~10, x=1~2n+1));
and a liquid crystal layer between the first and second substrates.

7. The liquid crystal display device according to claim 6, further comprising a second alignment layer on the second substrate.

8. The liquid crystal display device according to claim 7, wherein the second alignment layer includes a material selected from the group consisting of a pyranose polymer, a furanose polymer, polyvinyl cinnamate, polysiloxane cinnamate, polyvinyl alcohol, polyamide, polyimide, polyamic acid and silicone dioxide.

9. The liquid crystal display device according to claim 7, wherein at least one of the first and second alignment layers is divided into at least two domains for driving liquid crystal molecules in the liquid crystal layer differently on each domain.

10. The liquid crystal display device according to claim 6, wherein the non-photo-sensitive constituents include a material selected from the group consisting of H, $C_nH_{2n}$, $C_nH_{2n+1}$, $C_nH_{2n}OH$, $COC_nH_{2n+1}$, $C_nH_{2n+1-x}F_x$, $C_nH_{2n-(x-1)}F_{(x-1)}$, $C_nH_{2n-(x-1)}F_{x-1}OH$, $COC_nH_{2n+1-x}F_x$ (n=1~10, x=1~2n+1), and a combination thereof.

11. A liquid crystal display device, comprising: first and second substrates; a first alignment layer on the first substrate, wherein the first alignment layer includes

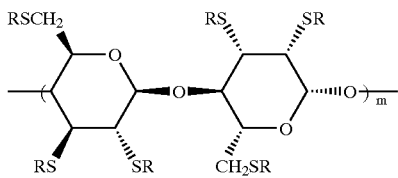

where the spacer S is $OC_hH_{2h}$, where h=1~5, where m=10~10,000, and where the functional group R includes photosensitive constituents which include a cinnamoyl derivative and/or non-photosensitive constituents, wherein the cinnamoyl derivative is

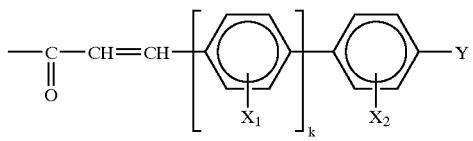

(X1 and X2 are each selected from the group consisting of hydrogen, fluorine, chlorine, CN, NO2, CH3, OCH3, CF3, OCF3; k is 0 to 1; Y is selected from the group consisting of hydrogen, fluorine, chlorine, cyano, $NO_2$, $CF_3$, $OCF_3$, $C_nH_{2n+1}$, $OC_nH_{2n+1}$, $C_nH_{2n+1-x}F_x$, $OCH_nH_{2n+1-x}F_x$ (n=1~10, x=1~2n+1));
and a liquid crystal layer between the first and second substrates.

12. The liquid crystal display device according to claim 11, further comprising a second alignment layer on the second substrate.

13. The liquid crystal display device according to claim 12, wherein the second alignment layer includes a material selected from the group consisting of a pyranose polymer, a furanose polymer, polyvinyl cinnamate, polysiloxane cinnamate, polyvinyl alcohol, polyamide, polyimide, polyamic acid and silicone dioxide.

14. The liquid crystal display device according to claim 12, wherein at least one of the first and second alignment layers is divided into at least two domains for driving liquid crystal molecules in the liquid crystal layer differently on each domain.

15. The liquid crystal display device according to claim 11, wherein the non-photo-sensitive constituents include a material selected from the group consisting of H, $OC_nH_{2n}$, $OC_nH_{2n+1}$, $COC_nH_{2n+1}$, $C_nH_{2n}OH$, $OC_nH_{2n}OH$, $OCOC_nH_{2n+1}$, $OC_nH_{2n+1-x}F_x$, $OC_nH_{2n-(x-1)}F_{(x-1)}$, $C_nH_{2n-(x-1)}F_{(x-1)}OH$, $OC_nH_{2n-(x-1)}F_{x-1}OH$, $COC_nH_{2n+1-x}F_x$, $OCOC_nH_{2n+1-x}F_x$ (n=1~10, x=1~2n+1), and a combination thereof.

16. A liquid crystal display device, comprising: first and second substrates; a first alignment layer on the first substrate, wherein the first alignment layer includes

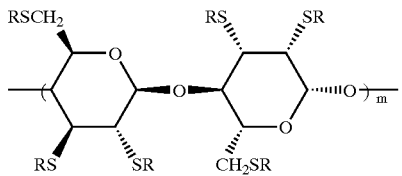

where the spacer S is $OC_hH_{2h}O$, where h=1~5, where m=10~10,000, and where the functional group R includes photosensitive constituents which include a cinnamoyl derivative and/or non-photosensitive constituents, wherein the cinnamoyl derivative is

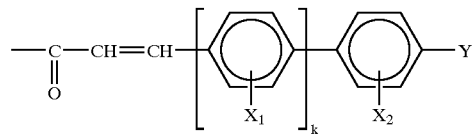

(X1 and X2 are each selected from the group consisting of hydrogen, fluorine, chlorine, CN, NO2, CH3, OCH3, CF3, OCF3; k is 0 to 1; Y is selected from the group consisting of hydrogen, fluorine, chlorine, cyano, $NO_2$, $CF_3$, $OCF_3$, $C_nH_{2n+1}$, $OC_nH_{2n+1}$, $C_nH_{2n+1-x}F_x$, $OC_nH_{2n+1-x}F_x$ (n=1~10, x=1~2n+1));
and a liquid crystal layer between the first and second substrates.

17. The liquid crystal display device according to claim 16, further comprising a second alignment layer on the second substrate.

18. The liquid crystal display device according to claim 17, wherein the second alignment layer includes a material selected from the group consisting of a pyranose polymer, a furanose polymer, polyvinyl cinnamate, polysiloxane cinnamate, polyvinyl alcohol, polyamide, polyimide, polyamic acid and silicone dioxide.

19. The liquid crystal display device according to claim 17, wherein at least one of the first and second alignment layers is divided into at least two domains for driving liquid crystal molecules in the liquid crystal layer differently on each domain.

20. The liquid crystal display device according to claim 16, wherein the non-photo-sensitive constituents include a material selected from the group consisting of H, $C_nH_{2n}$, $C_nH_{2n+1}$, $C_nH_{2n}OH$, $COC_nH_{2n+1}$, $C_nH_{2n+1-x}F_x$, $C_nH_{2n-(x-1)}F_{(x-1)}$, $C_nH_{2n-(x-1)}F_{x-1}OH$, $COC_nH_{2n+1-x}F_x$ (n=1~10, x=1~2n+1), and a combination thereof.

* * * * *